United States Patent
Jung et al.

(10) Patent No.: US 10,568,055 B2
(45) Date of Patent: Feb. 18, 2020

(54) METHOD AND APPARATUS FOR COMMUNICATING SYNCHRONIZATION SIGNALS

(71) Applicant: Motorola Mobility LLC, Chicago, IL (US)

(72) Inventors: Hyejung Jung, Palatine, IL (US); Ziad Ahmad, Chicago, IL (US); Vijay Nangia, Woodridge, IL (US); Ravikiran Nory, Buffalo Grove, IL (US); Ravi Kuchibhotla, Gurnee, IL (US); Robert Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 174 days.

(21) Appl. No.: 15/905,757

(22) Filed: Feb. 26, 2018

(65) Prior Publication Data

US 2018/0255522 A1    Sep. 6, 2018

Related U.S. Application Data

(60) Provisional application No. 62/467,079, filed on Mar. 3, 2017.

(51) Int. Cl.
*H04W 56/00* (2009.01)
*H04W 72/04* (2009.01)

(52) U.S. Cl.
CPC ....... *H04W 56/001* (2013.01); *H04W 72/044* (2013.01)

(58) Field of Classification Search
CPC ............. H04W 56/001; H04W 72/044; H04W 56/0005; H04W 72/0406; H04L 27/2613; H04L 5/005; H04L 27/2692; H04L 27/261
See application file for complete search history.

(56) References Cited

U.S. PATENT DOCUMENTS

| | | | |
|---|---|---|---|
| 10,390,198 B2 * | 8/2019 | Moulsley | H04W 16/32 |
| 2011/0228877 A1 * | 9/2011 | Han | H04L 5/0007 |
| | | | 375/295 |

(Continued)

OTHER PUBLICATIONS

Chave, PCT International Application Search Report, International Application No. PCT/US2018/020052, European Patent Office, Rijswijk, NL, dated May 16, 2018.

(Continued)

*Primary Examiner* — Wutchung Chu
(74) *Attorney, Agent, or Firm* — Loppnow & Chapa; Matthew C. Loppnow

(57) ABSTRACT

A method and apparatus can communicate synchronization signals. A first Synchronization Signal (SS) associated with a first Identity (ID) can be received. A first SS sequence for the first SS can be defined by at least an element-wise multiplication of a first cyclically shifted sequence with a second cyclically shifted sequence. The first cyclically shifted sequence can be a first base sequence cyclically shifted with a first cyclic shift value. The second cyclically shifted sequence can be a second base sequence cyclically shifted with a second cyclic shift value. A second SS associated with a second ID can be received. A second SS sequence for the second SS can be defined by at least an element-wise multiplication of a third cyclically shifted sequence with a fourth cyclically shifted sequence. The third cyclically shifted sequence can be the first base sequence cyclically shifted with a third cyclic shift value. The fourth cyclically shifted sequence can be the second base sequence cyclically shifted with a fourth cyclic shift value. The first ID and second ID can be determined to be the same in response to the first cyclic shift value and the third cyclic shift value being same and the second cyclic shift value and the fourth cyclic shift value being different.

22 Claims, 14 Drawing Sheets

(56) References Cited

U.S. PATENT DOCUMENTS

| | | | |
|---|---|---|---|
| 2014/0211736 A1* | 7/2014 | Noh | H04L 5/0051 370/329 |
| 2014/0254530 A1* | 9/2014 | Kim | H04L 5/0019 370/329 |
| 2016/0218821 A1* | 7/2016 | Adhikary | H04J 11/0069 |
| 2017/0126383 A1* | 5/2017 | Yamada | H04W 72/08 |
| 2018/0287845 A1* | 10/2018 | Kim | H04W 4/70 |
| 2018/0316452 A1* | 11/2018 | Chen | H04W 16/02 |
| 2018/0316464 A1* | 11/2018 | Stern-Berkowitz | H04L 1/0034 |

OTHER PUBLICATIONS

MCC: "Correction of typos due to wrong implementation of CR0283 "Clarification of valid subframe in eMTC"", 3GPP Draft; 36211_CR0295_(REL-13)_ RI-1610439, 3rd Generation Partnership Project (3GPP), Mobile Competence Centre , 650, Route Des Lucioles , F-06921 Sophia-Antipolis Cedex ; France, vol. RAN WG1, No. Lisbon, Portugal; Oct. 10, 2016-Oct. 14, 2016, Dec. 4, 2016.

Motorola Mobility et al: "Numerology and structure for NR synchronization signal", 3GPP Draft; RI-1703043 Numerology and Structure for NR SS, 3rd Generation Partnership Project (3GPP), Mobile Competence Centre; 650, Route Des Lucioles ; F-06921 Sophia-Antipolis Cedex ; France, vol. RAN WG1, No. Athens, Greece; Feb. 13, 2017-Feb. 17, 2017, Feb. 12, 2017.

Qualcomm Incorporated: "Synchronization signal sequence design consideration", 3GPP Draft; RI-1700787 Synchronization Signal Sequence Design Consideration, 3rd Generation Partnership Project (3GPP), Mobile Competence Centre; 650, Route Des Lucioles ; F-06921 Sophia-Antipolis CE, vol. RAN WG1, No. Spokane, USA; Jan. 16, 2017-Jan. 20, 2017, Jan. 10, 2017.

Motorola Mobility et al: "NR PSS and SSS design and evaluations", 3GPP Draft; RI-1705548, 3rd Generation Partnership Project (3GPP), Mobile Competence Centre; 650, Route Des Lucioles ; F-06921 Sophia-Antipolis Cedex ; France vol. RAN WG1, No. Spokane, USA; Apr. 3, 2017-Apr. 7, 2017, Apr. 2, 2017.

Samsung, R1-1700887, SS Sequence Design, 3GPP TSG RAN WG1 NR Ad-Hoc Meeting, Jan. 16-20, 2017, Spokane, USA.

* cited by examiner

METHOD AND APPARATUS FOR COMMUNICATING SYNCHRONIZATION SIGNALS

BACKGROUND

1. Field

The present disclosure is directed to a method and apparatus for communicating synchronization signals. More particularly, the present disclosure is directed to communicating synchronization signals on a wireless wide area network.

2. Introduction

Presently, wireless communication devices, such as user equipment, communicate with other communication devices using wireless signals. It is expected that new Fifth Generation (5G) Radio Access Technology (RAT), otherwise known as New Radio (NR) RAT, adopts dense small cell deployment in order to increase system capacity and to utilize various ranges of spectrum, such as frequency ranges both below 6 GHz and above 6 GHz. In high frequency bands, such as above 6 GHz, dense small cell deployment is crucial to avoid coverage holes. With an increased number of cells, the number of supported cell Identities (IDs) needs to be increased for flexible network deployment without complex cell ID planning and for reducing potential cell ID confusion at a User Equipment (UE).

A proposal on Synchronization Signals (SS) design for new 5G RAT can include a method to use SS sequences of the length same as Long Term Evolution (LTE) Primary Synchronization Signals (PSS) and Secondary Synchronization Signals (SSS) and to employ power boosting for (SS) transmission. However, this proposal may not be suitable for support of a larger number of cell ID hypotheses, such as 1000 cell ID hypotheses. With short-length sequences, the number of sequences with good cross-correlation is expected to be limited, and cross-correlation performance among sequences would greatly improve with a longer sequence length. Further, power boosting of SS does not improve SS Signal-to-Interference and Noise Ratio (SINR) observed at a UE receiver.

Repetition of two short Zadoff-Chu (ZC) sequences in the time domain using doubled subcarrier spacing allows frequency offset estimation. However, Cyclic Prefix (CP) overhead can increase or CP length scaling can result in inter-symbol interference in high delay-spread channel conditions.

For message-based SSS transmission using channel coding, decoding performance is heavily dependent on timing, frequency, and channel estimation performances. With one or three PSS sequences along with dense cell deployment, accurate channel estimation may not be possible. Furthermore, SSS detection and demodulation performance would be limited by co-channel interference in dense deployment.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
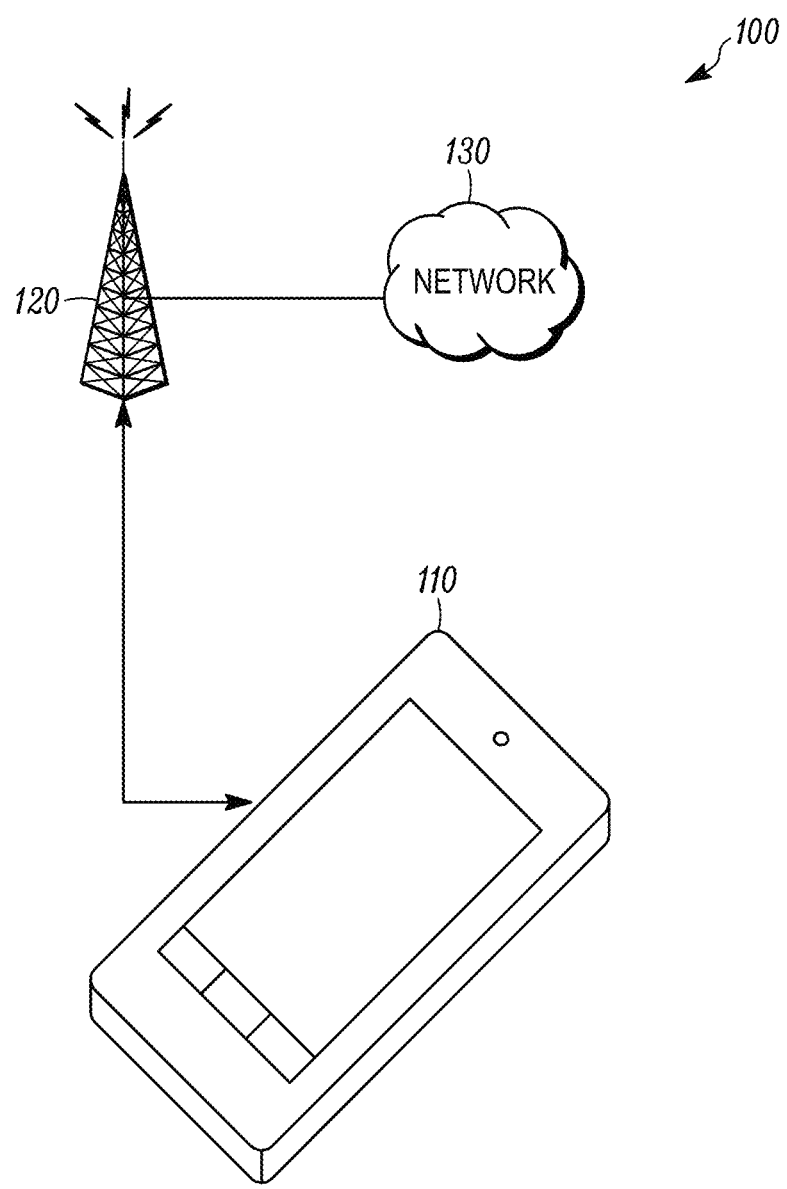
FIG. 1 is an example block diagram of a system according to a possible embodiment.

Embodiments provide a method and apparatus for communicating synchronization signals. According to a possible embodiment, a first Synchronization Signal (SS) associated with a first identity (ID) can be received. A first SS sequence for the first SS can be defined by at least an element-wise multiplication of a first cyclically shifted sequence with a second cyclically shifted sequence. The first cyclically shifted sequence can be a first base sequence cyclically shifted with a first cyclic shift value. The second cyclically shifted sequence can be a second base sequence cyclically shifted with a second cyclic shift value. A second SS associated with a second ID can be received. A second SS sequence for the second SS can be defined by at least an element-wise multiplication of a third cyclically shifted sequence with a fourth cyclically shifted sequence. The third cyclically shifted sequence can be the first base sequence cyclically shifted with a third cyclic shift value. The fourth cyclically shifted sequence can be the second base sequence cyclically shifted with a fourth cyclic shift value. The first ID and second ID can be determined to be the same in response to the first cyclic shift value and the third cyclic shift value being same and the second cyclic shift value and the fourth cyclic shift value being different.

According to another possible embodiment, a first SS associated with a first ID and a second SS associated with a second ID can be stored. A first SS sequence can be generated for the first SS. The first SS sequence can be defined by at least an element-wise multiplication of a first cyclically shifted sequence with a second cyclically shifted sequence. The first cyclically shifted sequence can be a first base sequence cyclically shifted with a first cyclic shift value. The second cyclically shifted sequence can be a second base sequence cyclically shifted with a second cyclic shift value. A second SS sequence can be generated for the second SS. The second SS sequence can be defined by at least an element-wise multiplication of a third cyclically shifted sequence with a fourth cyclically shifted sequence. The third cyclically shifted sequence can be the first base sequence cyclically shifted with a third cyclic shift value. The fourth cyclically shifted sequence can be the second base sequence cyclically shifted with a fourth cyclic shift value. The first SS associated with the first ID and the second SS associated with the second ID can be output.

Embodiments can provide methods to generate a large number of synchronization signal sequences, such as 1000 or more, which have enhanced cross-correlation performance than LTE Primary Synchronization Signal (PSS) and Secondary Synchronization Signal (SSS) sequences. In addition, the disclosed methods can easily support multi-antenna port transmission of SSs and/or allow User Equipments (UEs) with different UE bandwidths to perform cell detection via interleaving and/or concatenation of multiple sequences.

FIG. 1 is an example block diagram of a system 100 according to a possible embodiment. The system 100 can include a UE 110, a base station 120, and a network 130. The UE 110 can be a wireless wide area network device, a user device, wireless terminal, a portable wireless communication device, a smailphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The base station 120 can be a wireless wide area network base station, a NodeB, an enhanced NodeB (eNB), a 5G NodeB (gNB), an unlicensed network base station, an access point, a Transmission Reception Point (TRP) coupled to a base station, a network entity, or any other base station that can provide wireless access between a UE and a network.

The network 130 can include any type of network that is capable of sending and receiving wireless communication signals. For example, the network 130 can include network entities and can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5G, a 3rd Generation Partnership Project (3GPP)-based network, a satellite communications network, a high altitude platform network, the Internet, and/or other communications networks.

With multi-beam-based system operation, a Network Entity (NE) can transmit more than one SS block within an SS burst set periodicity, where each of the SS blocks can carry at least PSS and SSS transmitted via a common pool of antenna ports, and where the SS burst set can include one or more SS blocks. UE blind detection for slot and/or frame timing information from PSS/SSS may be neither feasible nor efficient. Instead, according to a possible embodiment, the NE can indicate slot and frame timing information, such as symbol index and/or slot index, via a tertiary synchronization signal/channel or physical broadcast channel Thus, the NE may transmit the same PSS and SSS sequences for all SS blocks of a given cell. If a Tertiary Synchronization Channel (TSCH) is scrambled by a scrambling sequence associated with a full or partial cell ID carried by PSS/SSS and includes CRC, then a UE can check the validity of detected cell ID by decoding TSCH and checking CRC of decoded TSCH. For PSS, one or three Zadoff-Chu (ZC) sequences can be employed for good timing and frequency synchronization performance with low UE detection complexity.

For generation of SSS sequences, in one embodiment, a basic binary sequence $d_0(0), \ldots, d_0(L-1)$ that can be used to generate the SSS can be constructed from three maximum-length shift-register sequences (m-sequences) of length-L according to $$d_0(n)=s_1(n)s_2^{(p)}(n)c^{(q_0)}(n),$$

where $0 \le n \le L-1$. The indices p and $q_0$ can be derived from the cell-identity $N_{ID}$ according to $$p=N_{ID} \bmod(L), q_0=\lfloor N_{ID}/L \rfloor.$$

The first sequence $s_1(n)$ can be an m-sequence of length-L. The second and third sequences $s_2^{(p)}(n)$ and $c^{(q_0)}(n)$ can be defined by a cyclic shift of the m-sequence $s_2(n)$ and a cyclic shift of the m-sequence $c(n)$, respectively, according to $$s_2^{(p)}(n)=s_2((n+p) \bmod L),$$

$$c^{(q_0)}(n)=c((n+q_0) \bmod L).$$

In another example, $q_0$ can be defined by $q_0=1 \cdot \lfloor N_{ID}/L \rfloor$, wherein l can be a positive integer. The value l can be determined, based on the total number of supported cell IDs, the sequence length-L, and/or the number of concatenated or interleaved sequences for SSS.

The cell-identity $N_{ID}$ can be determined jointly by the physical-layer cell identity group $N_{ID}^{(1)}$ and the physical-layer identity $N_{ID}^{(2)}$, e.g. $N_{ID}^{(1)} \in \{0, 1, \ldots 333\}$, $N_{ID}^{(2)} \in \{0,1,2\}$, and $N_{ID}=3 \cdot N_{ID}^{(1)}+N_{ID}^{(2)}$. If more than one PSS sequence is defined, the physical-layer identity $N_{ID}^{(2)}$ information can be carried by PSS. Alternatively, one PSS sequence can be defined, and a UE can use the PSS not for obtaining partial or full information on the cell-identity, but for timing and frequency synchronization. In this case, SSS alone can be used to carry cell-identity information.

In one possible embodiment, the SSS sequence d(n) can be the same as the basic sequence as follows:

$$d(n)=d_0(n), \text{ where } 0 \le n \le L-1.$$

In another possible embodiment, the SSS sequence can be constructed by concatenation and/or interleaving of K sequences of length-L. With concatenation of K sequences, the SSS sequence of length-(K·L) can be defined by $$d(n) = d_0(n),$$

$$d(n + L) = d_1(n),$$

$$\vdots$$

$$d(n + (K - 1) \cdot L) = d_{K-1}(n),$$

where $0 \le n \le L-1$. With interleaving and concatenation of K sequences, where K can be an even number, the SSS sequence of length-(K·L) can be defined by $$d(2n) = d_0(n),$$

$$d(2n + 1) = d_1(n),$$

-continued $$d(2n + 2L) = d_2(n),$$
$$d(2n + 1 + 2L) = d_3(n),$$
$$\vdots$$
$$d(2n + (K/2 - 1) \cdot 2L) = d_{K-2}(n),$$
$$d(2n + 1 + (K/2 - 1) \cdot 2L) = d_{K-1}(n),$$

where $0 \le n \le L-1$. With interleaving of K sequences, the SSS sequence of length-(K·L) can be defined by $$d(n \cdot K) = d_0(n),$$
$$d(n \cdot K + 1) = d_1(n),$$
$$\vdots$$
$$d(n \cdot K + K - 2) = d_{K-2}(n),$$
$$d(n \cdot K + K - 1) = d_{K-1}(n),$$

where $0 \le n \le L-1$. The k-th sequence $d_k(n)$ used for concatenation and/or interleaving can be generated by applying a cyclic shift of the m-sequence c(n) different from $q_0$ according to $$d_k(n) = s_1(n) s_2^{(p)}(n) c^{(q_k)}(n),$$

where the cyclic shift value $q_k$ can be defined by $$q_k = q_0 + n_{offset}^k = \lfloor N_{ID}/L \rfloor + n_{offset}^k,$$

where $1 \le k \le K-1$. In one example, $n_{offset}^k = k \cdot \lceil L/K \rceil$.

And yet in another embodiment, the m-sequences $s_1(n)$ and $s_2(n)$ can be a preferred pair of m-sequences that can generate L−1 additional sequences resulting in bounded low cross-correlation. In this case, L sequences generated by $s_1(n) s_2^{(p)}(n)$ can be a part of Gold sequences.

In the following embodiments, examples of m-sequences used for generating basic sequences of different lengths can be provided. According to a possible embodiment, m-sequences can be used for generating length-63 basic sequences. The first m-sequence $s_1(n)$ can be given by $s_1(n)=1-2x(n)$, $0 \le n \le 62$, where x(n) can be defined by $$x(i+6)=(x(i+5)+x(i)) \bmod 2, 0 \le i \le 56$$

with initial conditions x(0)=0, x(1)=0, x(2)=0, x(3)=0, x(4)=0, x(5)=1.

The second m-sequence $s_2(n)$ can be given by $s_2(n)=1-2x(n)$, $0 \le n \le 62$, where x(n) can be defined by $$x(i+6)=(x(i+5)+x(i+4)+x(i+1)+x(i)) \bmod 2, 0 \le i \le 56$$

with initial conditions x(0)=0, x(1)=0, x(2)=0, x(3)=0, x(4)=0, x(5)=1.

The third m-sequence c(n) can be given by c(n)=1−2x(n), $0 \le n \le 62$, where x(n) can be defined by $$x(i+6)=(x(i+5)+x(i+4)+x(i+2)+x(i+1)) \bmod 2, 0 \le i \le 56$$

with initial conditions x(0)=0, x(1)=0, x(2)=0, x(3)=0, x(4)=0, x(5)=1.

According to another possible embodiment, m-sequences can be used for generating length-127 basic sequences. The first m-sequence $s_1(n)$ can be given by $s_1(n)=1-2x(n)$, $0 \le n \le 126$, where x(n) can be defined by $$x(i+7)=(x(i+6)+x(i+2)) \bmod 2, 0 \le i \le 119$$

with initial conditions x(0)=0, x(1)=0, x(2)=0, x(3)=0, x(4)=0, x(5)=0, x(6)=1.

The second m-sequence $s_2(n)$ can be given by $s_2(n)=1-2x(n)$, $0 \le n \le 126$, where x(n) can be defined by $$x(i+7)=(x(i+6)+x(i+2)+x(i+1)+x(i)) \bmod 2, 0 \le i \le 119$$

with initial conditions x(0)=0, x(1)=0, x(2)=0, x(3)=0, x(4)=0, x(5)=0, x(6)=1.

The third m-sequence c(n) can be given by c(n)=1−2x(n), $0 \le n \le 126$, where x(n) can be defined by $$x(i+7)=(x(i+6)+x(i+4)+x(i+3)+x(i+2)+x(i+1)+x(i)) \bmod 2, 0 \le i \le 119$$

with initial conditions x(0)=0, x(1)=0, x(2)=0, x(3)=0, x(4)=0, x(5)=0, x(6)=1.

According to another possible embodiment, m-sequences can be used for generating length-255 basic sequences. The first m-sequence $s_1(n)$ can be given by $s_1(n)=1-2x(n)$, $0 \le n \le 254$, where x(n) can be defined by $$x(i+8)=(x(i+7)+x(i+6)+x(i+5)+x(i+4)+x(i+1)+x(1)) \bmod 2, 0 \le i \le 246$$

with initial conditions $$x(0)=0, x(1)=0, x(2)=0, x(3)=0, x(4)=0, x(5)=0, x(6)=0, x(7)=1.$$

The second m-sequence $s_2(n)$ can be given by $s_2(n)=1-2x(n)$, $0 \le n \le 254$, where x(n) can be defined by $$x(i+8)=(x(i+7)+x(i+5)+x(i+4)+x(i+2)) \bmod 2, 0 \le i \le 246$$

with initial conditions $$x(0)=0, x(1)=0, x(2)=0, x(3)=0, x(4)=0, x(5)=0, x(6)=0, x(7)=1.$$

The third m-sequence c(n) can be given by c(n)=1−2x(n), $0 \le n \le 254$, where x(n) can be defined by $$x(i+8)=(x(i+7)+x(i+5)+x(i+4)+x(i)) \bmod 2, 0 \le i \le 246$$

with initial conditions $$x(0)=0, x(1)=0, x(2)=0, x(3)=0, x(4)=0, x(5)=0, x(6)=0, x(7)=1.$$

Figure 2:
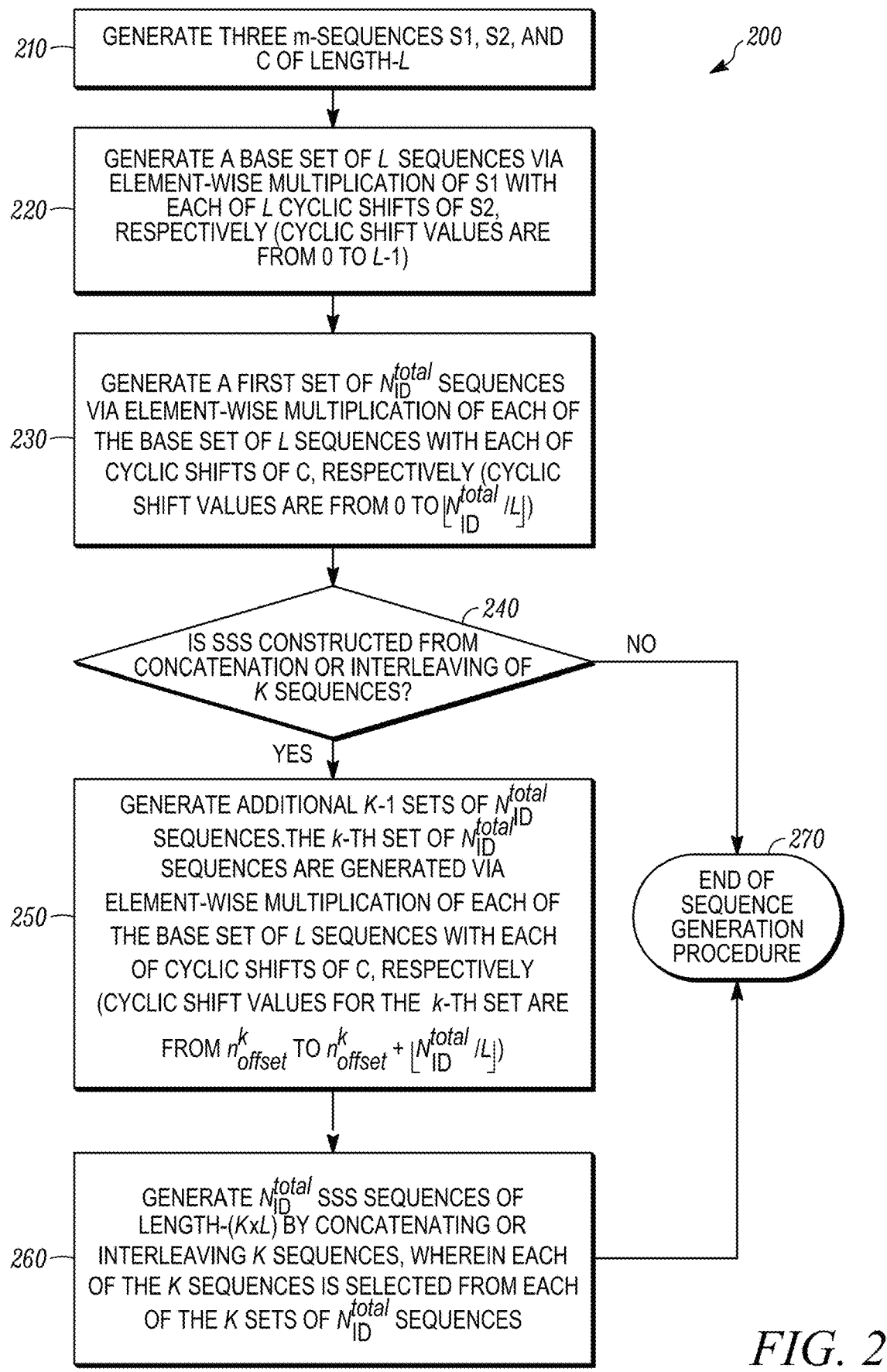
FIG. 2 is an example flowchart illustrating an example of SSS sequence generation procedure that can be used by a UE for cell detection according to a possible embodiment.

FIG. 2 is an example flowchart 200 illustrating an example of SSS sequence generation procedure that can be used by a UE for cell detection according to a possible embodiment. In this embodiment, the UE can generate SSS sequences corresponding to all possible cell ID hypotheses and perform cross-correlation between received signals and the generated SSS sequences.

At 210, in order to generate all possible SSS sequences, the UE can first generate three m-sequences S1, S2, and C of length-L. At 220, the UE can generate a base set of L sequences via element-wise multiplication of S1 with each of L cyclic shifts of S2, respectively, where the cyclic shift values can be from 0 to L−1. At 230, the UE can generate a first set of $N_{ID}^{total}$ sequences via element-wise multiplication of each of the base set of L sequences with each of cyclic shifts of C, respectively, where the cyclic shift values can be from 0 to $\lfloor N_{ID}^{total}/L \rfloor$.

At 240, a determination can be made as to whether SSS is constructed from concatenation or interleaving of K sequences. At 250, if SSS is constructed from concatenation or interleaving of K sequences, the UE can further generate additional K−1 sets of $N_{ID}^{total}$ sequences. The k-th set of $N_{ID}^{total}$ sequences can be generated via element-wise multiplication of each of the base set of L sequences with each of cyclic shifts of C, respectively, wherein the cyclic shift values for the k-th set can be from $n_{offset}^k$ to $n_{offset}^k + \lfloor N_{ID}^{total}/L \rfloor$. At 260, the UE can generate $N_{ID}^{total}$ SSS sequences of length-(K×L) by concatenating or interleaving K sequences, where each of the K sequences can be selected from each of the K sets of $N_{ID}^{total}$ sequences. At 270, if concatenation or interleaving of multiple sequences is not employed for SSS or after the UE generates $N_{ID}^{total}$ SSS sequences of length-(K×L), the sequence generation procedure can end and the UE can use the first set of $N_{ID}^{total}$ sequences for cell detection.

Figure 3:
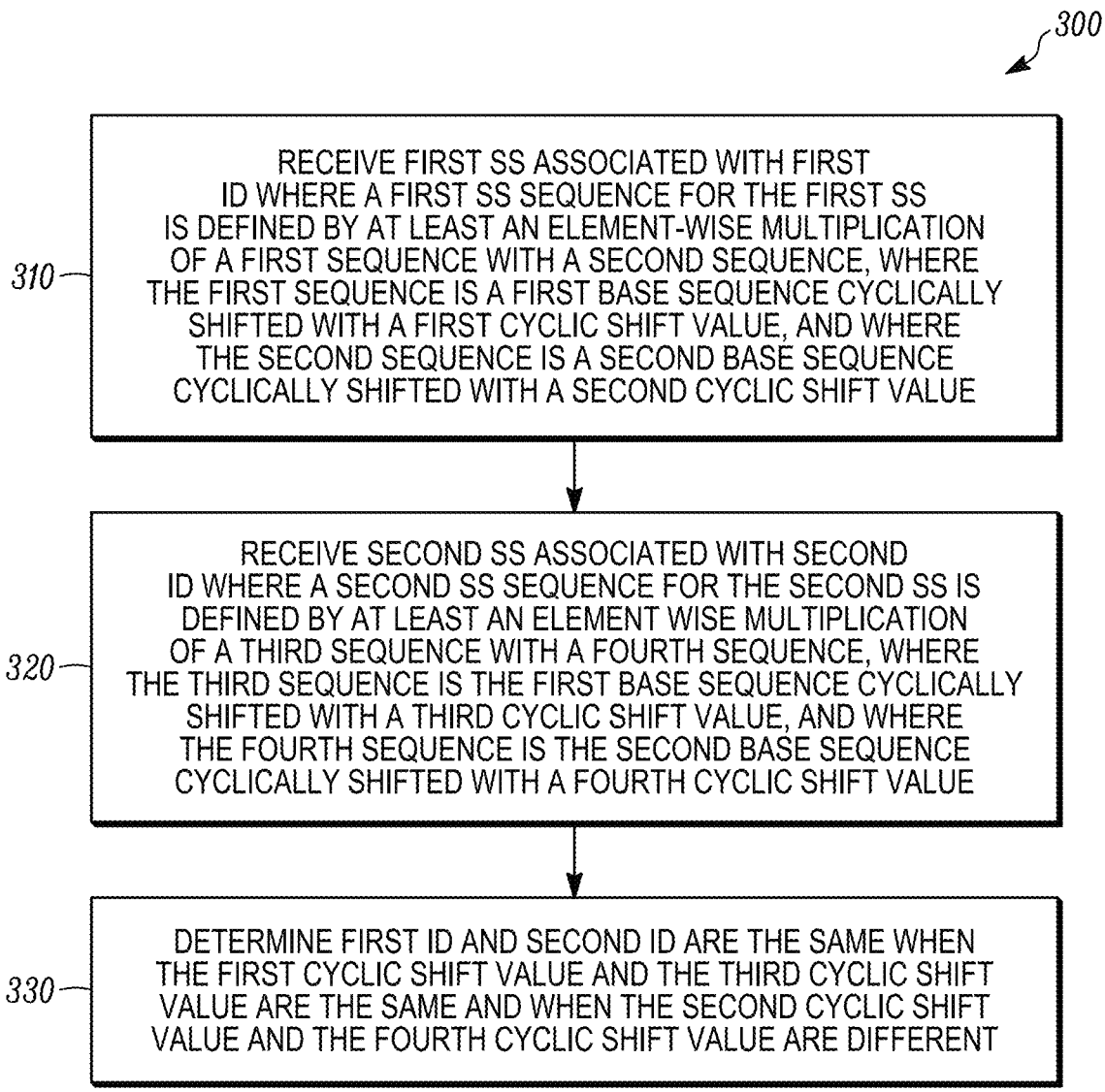
FIG. 3 is an example flowchart illustrating the operation of a wireless communication device according to a possible embodiment.
Figure 4:
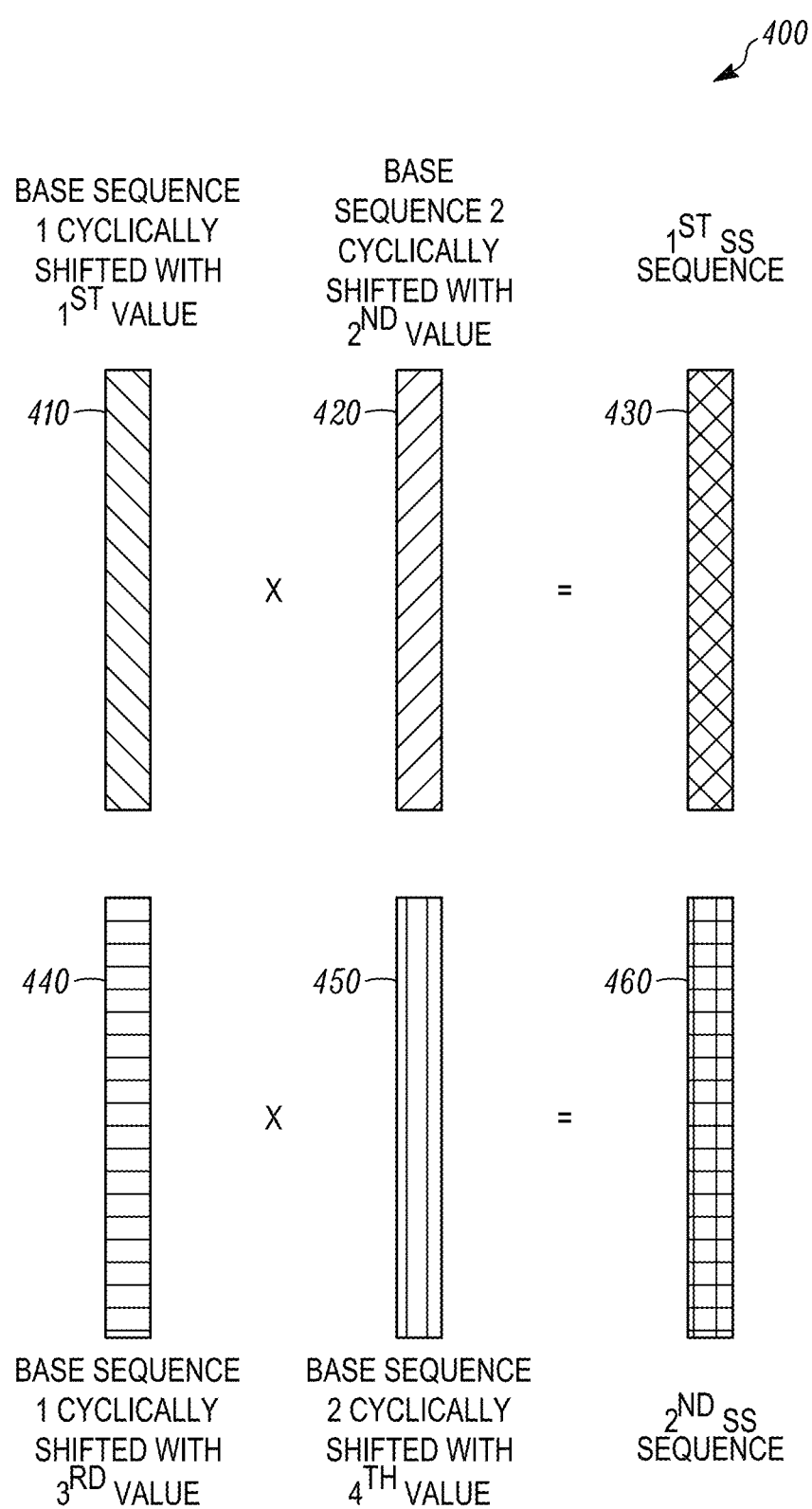
FIG. 4 is an example illustration of multiplying sequences according to a possible embodiment.

FIG. 3 is an example flowchart 300 illustrating the operation of a wireless communication device, such as a UE, according to a possible embodiment. FIG. 4 is an example illustration 400 of multiplying sequences according to a possible embodiment.

At 310, a first SS associated with a first ID can be received. The first ID can be physical cell identity. SSs can be used by a UE to acquire at least synchronization in time and frequency. The first SS can be received when operating with a first antenna port. A first SS sequence 430 for the first SS can be defined by at least an element-wise multiplication of a first cyclically shifted sequence 410 with a second cyclically shifted sequence 420. The first SS sequence 430 for the first SS can be mapped to a first set of subcarriers. The first set of subcarriers may or may not be contiguous. The first cyclically shifted sequence 410 can be a first base sequence, such as sequence S2, cyclically shifted with a first cyclic shift value. The first base sequence can be a maximum-length shift-register sequence. The second cyclically shifted sequence 420 can be a second base sequence, such as sequence C, cyclically shifted with a second cyclic shift value.

At 320, a second SS associated with a second ID can be received. The second ID can be physical cell identity. The second SS can be received when operating with a second antenna port. The second antenna port and the first antenna port can be different antenna ports. Alternately, the first SS can the second SS can be received on the same antenna port. Additionally, the first SS and the second SS may or may not be received from the same base station or from the same TRP. Also, the first SS and the second SS may or may not be received on the same bandwidth. A second SS sequence 460 for the second SS can be mapped to a second set of subcarriers. The second set of subcarriers may or may not be contiguous. The first set of subcarriers and the second set of subcarriers may or may not be non-overlapping. For example, the first SS and the second SS can be concatenated in the frequency domain on an OFDM symbol. According to another possible embodiment, the first SS and the second SS can be concatenated in the time domain on different OFDM symbols. The second SS sequence 460 for the second SS can be defined by at least an element-wise multiplication of a third cyclically shifted sequence 440 with a fourth cyclically shifted sequence 450. The third cyclically shifted sequence 440 and the fourth cyclically shifted sequence 450 can also be considered multiplicand sequences. The third cyclically shifted sequence 440 can be the first base sequence, such as sequence S2, cyclically shifted with a third cyclic shift value. The fourth cyclically shifted sequence 450 can be the second base sequence, such as sequence C, cyclically shifted with a fourth cyclic shift value. According to a possible implementation, at least the first and third cyclic shift values can be determined based on the first and second IDs, respectively. For example, a cyclic shift value p can be given by $p=N_{ID} \mod(L)$, where $N_{ID}$ can be a cell identity and L can be a length of the sequence.

At 330, a determination can be made that the first ID and second ID are the same in response to the first cyclic shift value and the third cyclic shift value being the same and the second cyclic shift value and the fourth cyclic shift value being different. The method can also include obtaining the cyclic shift values from their respective SSs, comparing the first cyclic shift value with the third cyclic shift value, and comparing the second cyclic shift value with the fourth cyclic shift value for making the determination that the first ID and second ID are the same. The first SS and the second SS can be used to synchronize with at least one base station. For example, the first SS and the second SS can be used to synchronize with a TRP associated with at least one base station. The synchronizing can be time and/or frequency synchronizing. Also, at least one physical cell identity can be determined using the first SS and the second SS. The at least one physical cell identity can be used to communicate with a wireless network.

Figure 5:
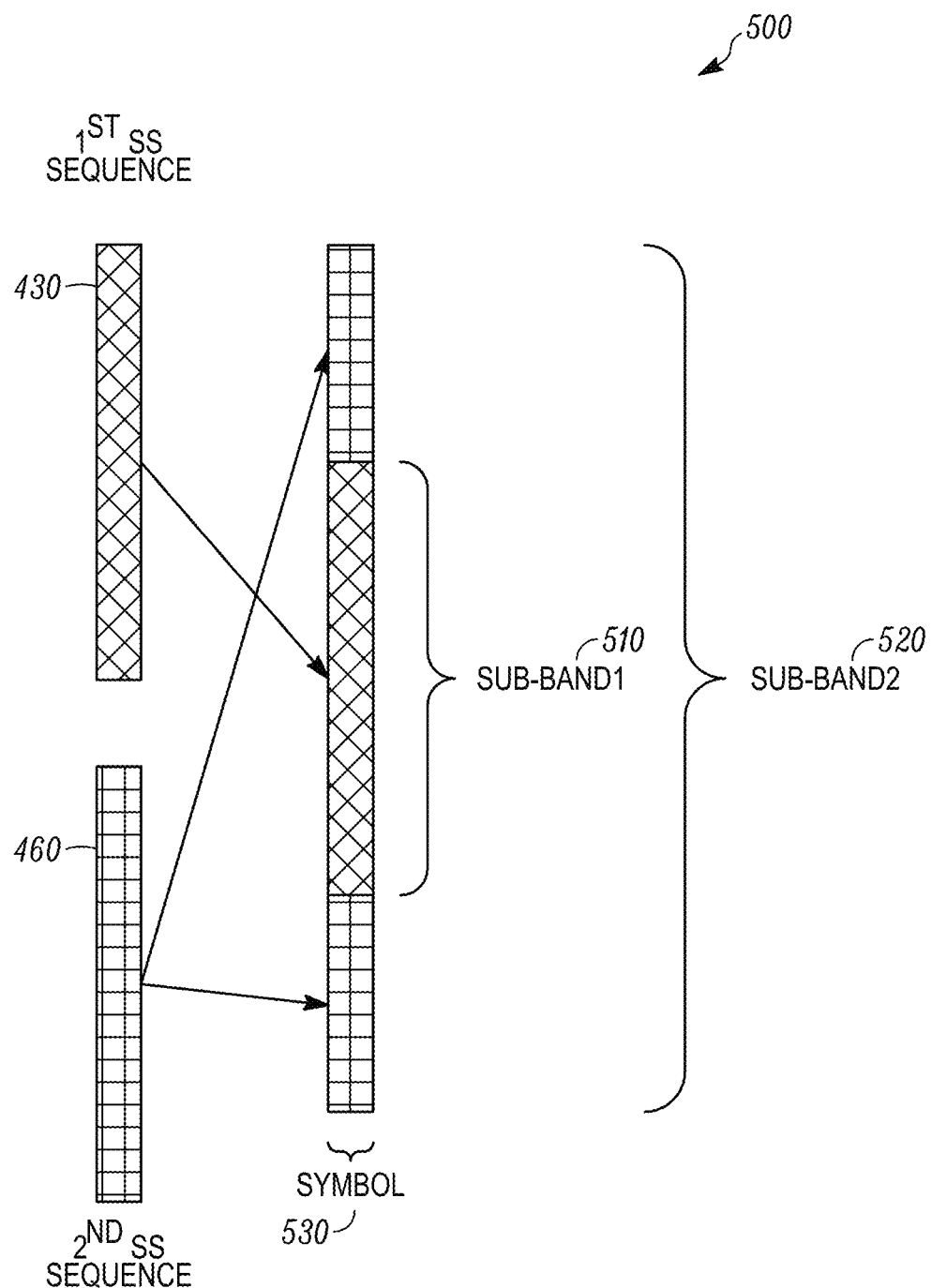
FIG. 5 is an example illustration of a first SS and a second SS in different bandwidths according to a possible embodiment.

FIG. 5 is an example illustration 500 of receiving the first SS and the second SS in different bandwidths according to a possible embodiment. The first SS sequence 430 for the first SS can be received in a first bandwidth 510. The first SS sequence 430 for the first SS and the second SS sequence 460 for the second SS can be received in a second bandwidth 520, such as on one or more OFDM symbols 530. The second bandwidth 520 can be larger than the first bandwidth 510. For example, the first SS sequence 430 for the first SS and the second SS sequence 460 for the second SS can be concatenated in the frequency domain, such as in the second bandwidth 520. The first SS sequence 430 for the first SS can be received in the first bandwidth 510 without the first SS sequence 430 for the first SS and the second SS sequence 460 for the second SS being received in the second bandwidth 520. According to a possible implementation, the second bandwidth 520 can include the first bandwidth 510 or they can be in different or partially overlapping frequencies. According to different implementations, there may or may not be frequency gaps in between the concatenated sequences. For example, there can be anywhere from guard band or smaller gaps up to gaps of multiple subcarrier widths in between the interleaved and/or concatenated sequences.

Figure 6:
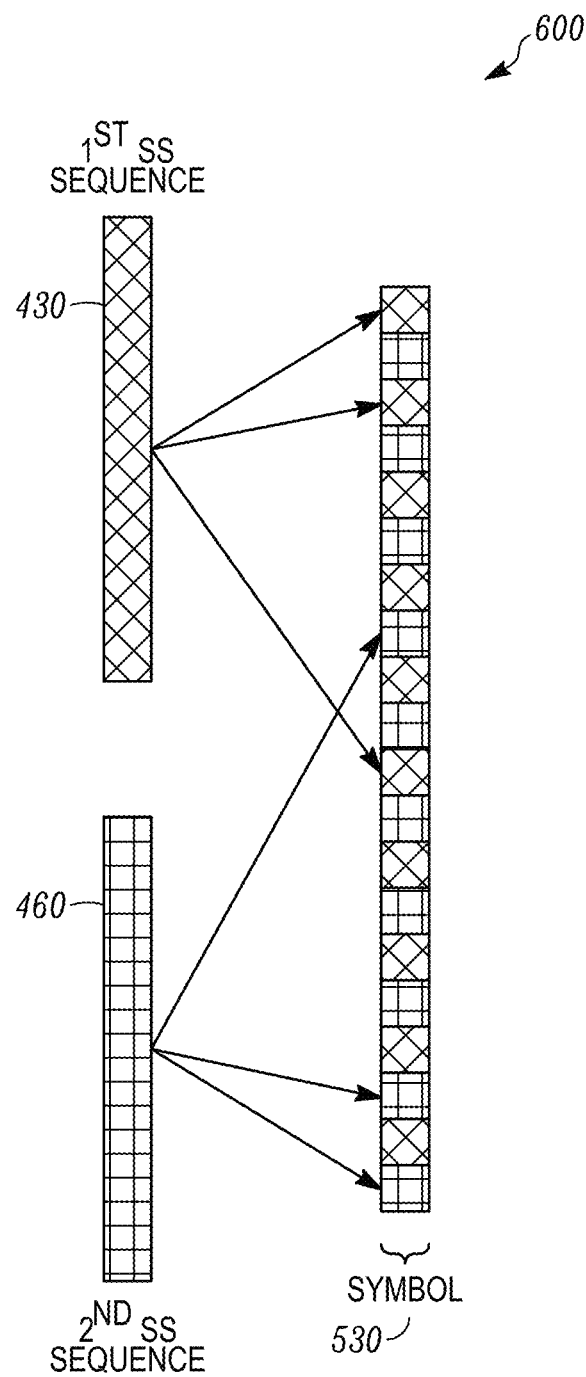
FIG. 6 is an example illustration of interleaving sequences in subcarriers according to a possible embodiment.

FIG. 6 is an example illustration 600 of interleaving sequences in subcarriers according to a possible embodiment. The first SS sequence 430 for the first SS can be mapped to a first set of subcarriers, such as within a OFDM symbol 530. The second SS sequence 460 for the second SS can be mapped to a second set of subcarriers, such as within the OFDM symbol 530. The first and second set of subcarriers can be interleaved.

Figure 7:
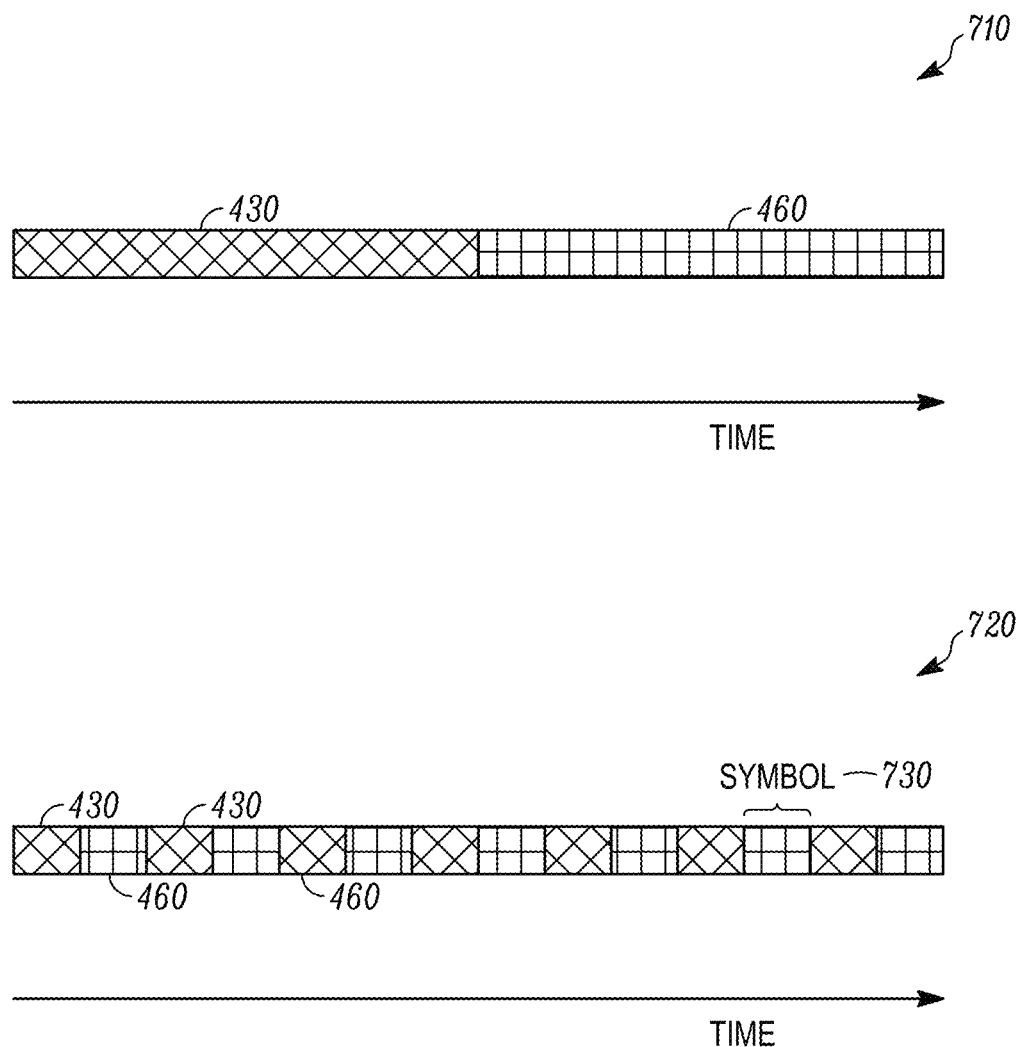
FIG. 7 shows example illustrations of receiving sequences in the time domain according to a possible embodiment.

FIG. 7 shows example illustrations 710 and 720 of receiving sequences in the time domain according to a possible embodiment. According to a possible embodiment, the first SS sequence 430 for the first SS and the second SS sequence 460 for the second SS can be received sequentially in the time domain as shown in the illustration 710. This can be employed for concatenation in the time domain. According to another possible embodiment, the first SS sequence 430 for the first SS and the second SS sequence 460 for the second SS can be received interleaved in the time domain, such as in different symbols like symbol 730 as shown in the illustration 720. There may or may not be gaps, such as short time gaps and/or at least one symbol-length gaps, between the first SS sequence 430 and the second SS sequence 460 for receiving them sequentially or interleaved.

Figure 8:
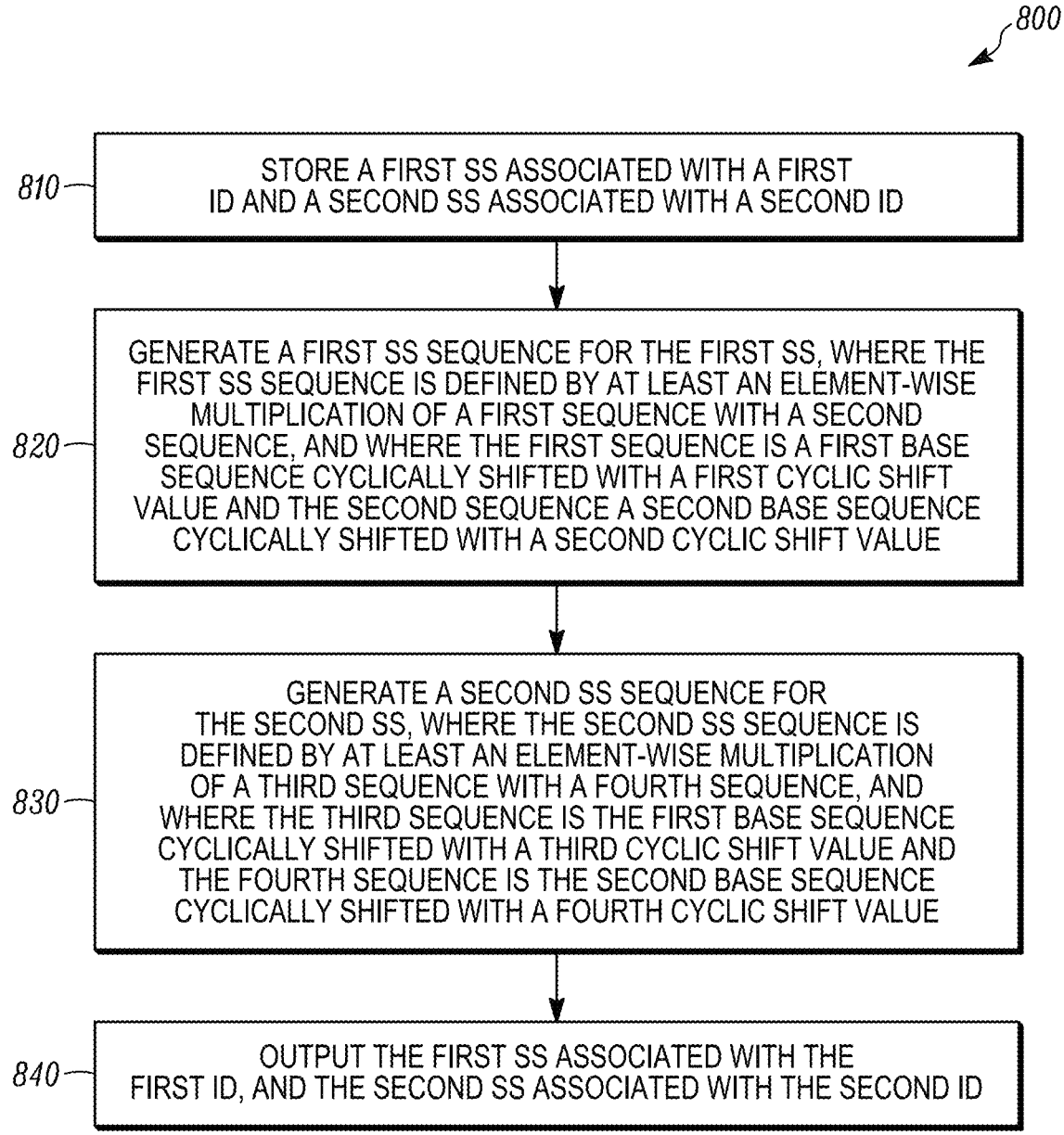
FIG. 8 is an example flowchart illustrating the operation of a network entity according to a possible embodiment.

FIG. 8 is an example flowchart 800 illustrating the operation of a network entity according to a possible embodiment. The network entity can be an eNB, a gNB, a TRP, a base station coupled to a TRP, a system controller, a baseband controller, and/or any other network entity. At 810, a first SS associated with a first ID and a second SS associated with a second ID can be stored.

At 820, a first SS sequence can be generated for the first SS. The first SS sequence can be defined by at least an element-wise multiplication of a first cyclically shifted sequence with a second cyclically shifted sequence. The first cyclically shifted sequence can be a first base sequence cyclically shifted with a first cyclic shift value. The second cyclically shifted sequence can be a second base sequence cyclically shifted with a second cyclic shift value. The first and second base sequences can be maximum-length shift-register sequences.

At 830, a second SS sequence can be generated for the second SS. The second SS sequence can be defined by at least an element-wise multiplication of a third cyclically shifted sequence with a fourth cyclically shifted sequence. The third cyclically shifted sequence can be the first base sequence cyclically shifted with a third cyclic shift value. The fourth cyclically shifted sequence can be the second base sequence cyclically shifted with a fourth cyclic shift value.

At 840, the first SS associated with the first ID and the second SS associated with the second ID can be output. According to a possible embodiment, first SS sequence for the first SS can be mapped to a first set of subcarriers. The second SS sequence for the second SS can be mapped to a second set of subcarriers. The first and second set of subcarriers can be interleaved. According to another possible embodiment, the first SS sequence for the first SS can be transmitted in a first bandwidth. The first SS sequence for the first SS and the second SS sequence for the second SS can be transmitted in a second bandwidth. The second bandwidth can be larger than the first bandwidth. According to another possible embodiment, first and second SS can be transmitted sequentially in the time domain. According to another possible implementation, the first SS sequence for the first SS and the second SS sequence for the second SS can be transmitted interleaved in the time domain. According to another possible implementation, the first SS sequence for the first SS can be mapped to a first set of subcarriers. The second SS sequence for the second SS can be mapped to a second set of subcarriers. The first set of subcarriers can be contiguous. The second set of subcarriers can be contiguous. The first set of subcarriers and the second set of subcarriers can be non-overlapping. According to another possible embodiment, the first SS sequence for the first SS can be transmitted with a first transmit antenna port and the second SS sequence for the second SS can be transmitted with a second transmit antenna port.

A UE can receive the first SS based on the UE operating with a first antenna port and can receive the second SS based on the UE operating with a second antenna port. The UE can determine at least one physical cell identity using the first SS and the second SS. The UE can be communicated with using the at least one physical cell identity.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
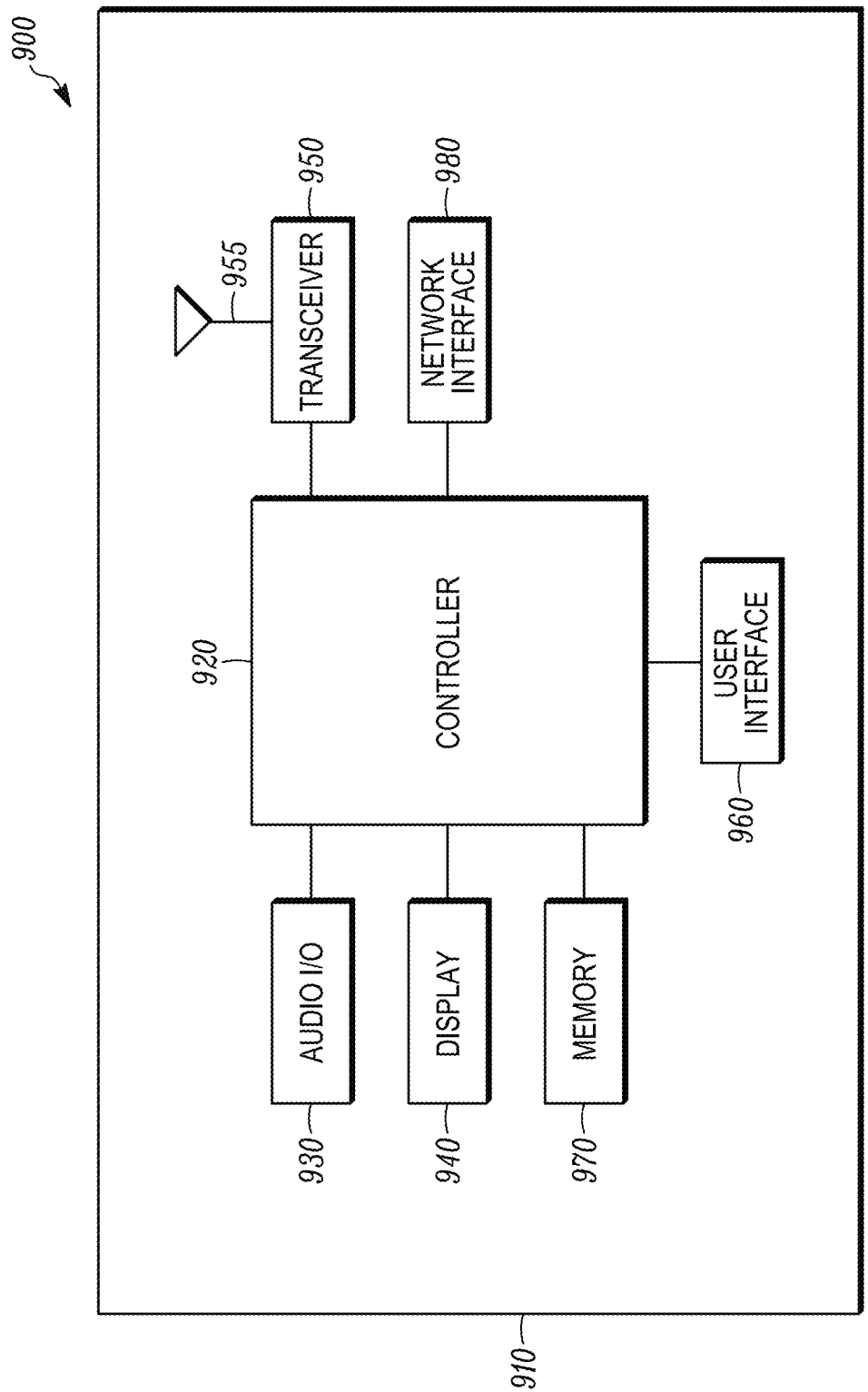
FIG. 9 is an example block diagram of an apparatus according to a possible embodiment.

FIG. 9 is an example block diagram of an apparatus 900, such as the UE 110, the base station 120, a network entity, or any other communication device disclosed herein, according to a possible embodiment. The apparatus 900 can include a housing 910, a controller 920 coupled to the housing 910, audio input and output circuitry 930 coupled to the controller 920, a display 940 coupled to the controller 920, a transceiver 950 coupled to the controller 920, an antenna 955 coupled to the transceiver 950, a user interface 960 coupled to the controller 920, a memory 970 coupled to the controller 920, and a network interface 980 coupled to the controller 920. The apparatus 900 may not necessarily include all of the illustrated elements for different embodiments of the present disclosure. The apparatus 900 can perform the methods described in all the embodiments.

The display 940 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 950 can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 970 can include a random access memory, a read only memory, an optical memory, a solid state memory, a flash memory, a removable memory, a hard drive, a cache, or any other memory that can be coupled to an apparatus.

The apparatus 900 or the controller 920 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 970 or elsewhere on the apparatus 900. The apparatus 900 or the controller 920 may also use hardware to implement disclosed operations. For example, the controller 920 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

In operation as a UE according to a possible embodiment, the transceiver 950 can receive a first synchronization signal associated with a first ID. A first SS sequence for the first SS can be defined by at least an element-wise multiplication of a first cyclically shifted sequence with a second cyclically shifted sequence. The first cyclically shifted sequence can be a first base sequence cyclically shifted with a first cyclic shift value. The first base sequence can be a maximum-length shift-register sequence. The second cyclically shifted sequence can be a second base sequence cyclically shifted with a second cyclic shift value. The second base sequence can be a maximum-length shift-register sequence.

The transceiver 950 can receive a second SS associated with a second ID. A second SS sequence for the second SS can be defined by at least an element-wise multiplication of a third cyclically shifted sequence with a fourth cyclically shifted sequence. The third cyclically shifted sequence can be the first base sequence cyclically shifted with a third cyclic shift value. The fourth cyclically shifted sequence can be the second base sequence cyclically shifted with a fourth cyclic shift value. The controller 920 can determine that the first ID and second ID are the same in response to the first cyclic shift value and the third cyclic shift value being the same and the second cyclic shift value and the fourth cyclic shift value being different.

According to a possible embodiment, the first SS sequence for the first SS can be received in a first bandwidth. The first SS sequence for the first SS and the second SS sequence for the second SS can be received in a second bandwidth. The second bandwidth can be larger than the first bandwidth. According to another possible embodiment, the first SS sequence for the first SS can be mapped to a first set of subcarriers. The second SS sequence for the second SS can be mapped to a second set of subcarriers. The first and second set of subcarriers can be interleaved. According to another possible embodiment, the first SS sequence for the first SS and the second SS sequence for the second SS can be received sequentially in the time domain. According to another possible embodiment, the first SS sequence for the first SS and the second SS sequence for the second SS can be received interleaved in the time domain.

According to another possible embodiment, the antenna 955 can be multiple antennas having multiple antenna ports. A first antenna port can receive the first SS when the apparatus 900 operates with the first antenna port. The second antenna port can receive the second SS when the apparatus 900 operates with the second antenna port.

According to a possible embodiment, the first SS sequence for the first SS can be mapped to a first set of subcarriers. The second SS sequence for the second SS can be mapped to a second set of subcarriers. The first set of subcarriers can be contiguous. The second set of subcarriers can be contiguous. The first set of subcarriers and the second set of subcarriers can be non-overlapping.

According to a possible embodiment, the controller 920 can synchronize with at least one base station using the first SS and the second SS. For example, the controller 920 can synchronize with at least one base station via the transceiver 950. According to another possible embodiment, the controller 920 can determine at least one physical cell identity based on the first SS and the second SS and the transceiver 950 can communicate, using the at least one physical cell identity, with a wireless network.

In operation as a network entity, such as an eNB, a gNB, a TRP, a system controller, a scheduler a baseband controller, and/or any other network entity according to a possible embodiment, the memory 970 can store a first SS associated with a first ID and a second SS associated with a second ID. The controller 920 can generate a first SS sequence for the first SS. The first SS sequence can be defined by at least an element-wise multiplication of a first cyclically shifted sequence with a second cyclically shifted sequence. The first cyclically shifted sequence can be a first base sequence cyclically shifted with a first cyclic shift value and the second cyclically shifted sequence can be a second base sequence cyclically shifted with a second cyclic shift value. The first and second base sequences can be maximum-length shift-register sequences.

The controller 920 can generate a second SS sequence for the second SS. The second SS sequence can be defined by at least an element-wise multiplication of a third cyclically shifted sequence with a fourth cyclically shifted sequence. The third cyclically shifted sequence can be the first base sequence cyclically shifted with a third cyclic shift value and the fourth cyclically shifted sequence can be the second base sequence cyclically shifted with a fourth cyclic shift value.

The first ID and the second ID can be the same based on the first cyclic shift value and the third cyclic shift value being same and based on the second cyclic shift value and the fourth cyclic shift value being different. According to a possible implementation, at least the first cyclic shift value can be determined based on the first ID, and at least the third cyclic shift value can be determined based on the second ID.

An interface, such as the network interface 980, the transceiver 950, an interface between the controller 920 and other components or devices, and/or any other interface, can output the first SS associated with the first ID and the second SS associated with the second ID. For example, the SS sequences can be generated by the controller 920 and sent to a TRP for transmission. According to another implementation, the TRP can be at a gNB, such as the apparatus 900, including a baseband controller, such as the controller 920. At least one TRP can be connected to a base station, such as the apparatus 900, and different TRP's can be in different locations.

The first SS sequence for the first SS can be transmitted in a first bandwidth, such as via the transceiver 950, via a TRP coupled to the network interface 980, or otherwise transmitted. The first SS sequence for the first SS and the second SS sequence for the second SS can be transmitted in a second bandwidth. The second bandwidth can be larger than the first bandwidth. According to a possible embodiment, the interface can be the transceiver 950, which can transmit the SS sequences. According to another possible embodiment, the interface can be a component or the network interface 980 that sends the SS sequences for transmission, such as from a TRP.

The first SS sequence for the first SS can be mapped, such as by the controller 920, to a first set of subcarriers. The second SS sequence for the second SS can be mapped, such as by the controller 920, to a second set of subcarriers. The first and second set of subcarriers can be interleaved. The first and second SS can also be transmitted sequentially in the time domain. The first SS sequence for the first SS and the second SS sequence for the second SS can further be transmitted interleaved in the time domain. Furthermore, for transmission, the first SS sequence for the first SS can be mapped to a first set of subcarriers, the second SS sequence for the second SS can be mapped to a second set of subcarriers. The first set of subcarriers can be contiguous. The second set of subcarriers can be contiguous. The first set of subcarriers and the second set of subcarriers can be non-overlapping.

The first SS sequence for the first SS can be transmitted with a first transmit antenna port and the second SS sequence for the second SS can be transmitted with a second transmit antenna port. For example, the antenna 955 can include multiple antennas that create the antenna ports for transmission of the SS sequences. The apparatus 900 can also send the SS sequences to another device, such as a TRP, for transmission from antenna ports at the other device. A UE can receive the first SS from the apparatus 900 based on the UE operating with a first antenna port and can receive the second SS based on the UE operating with a second antenna port.

Figure 10:
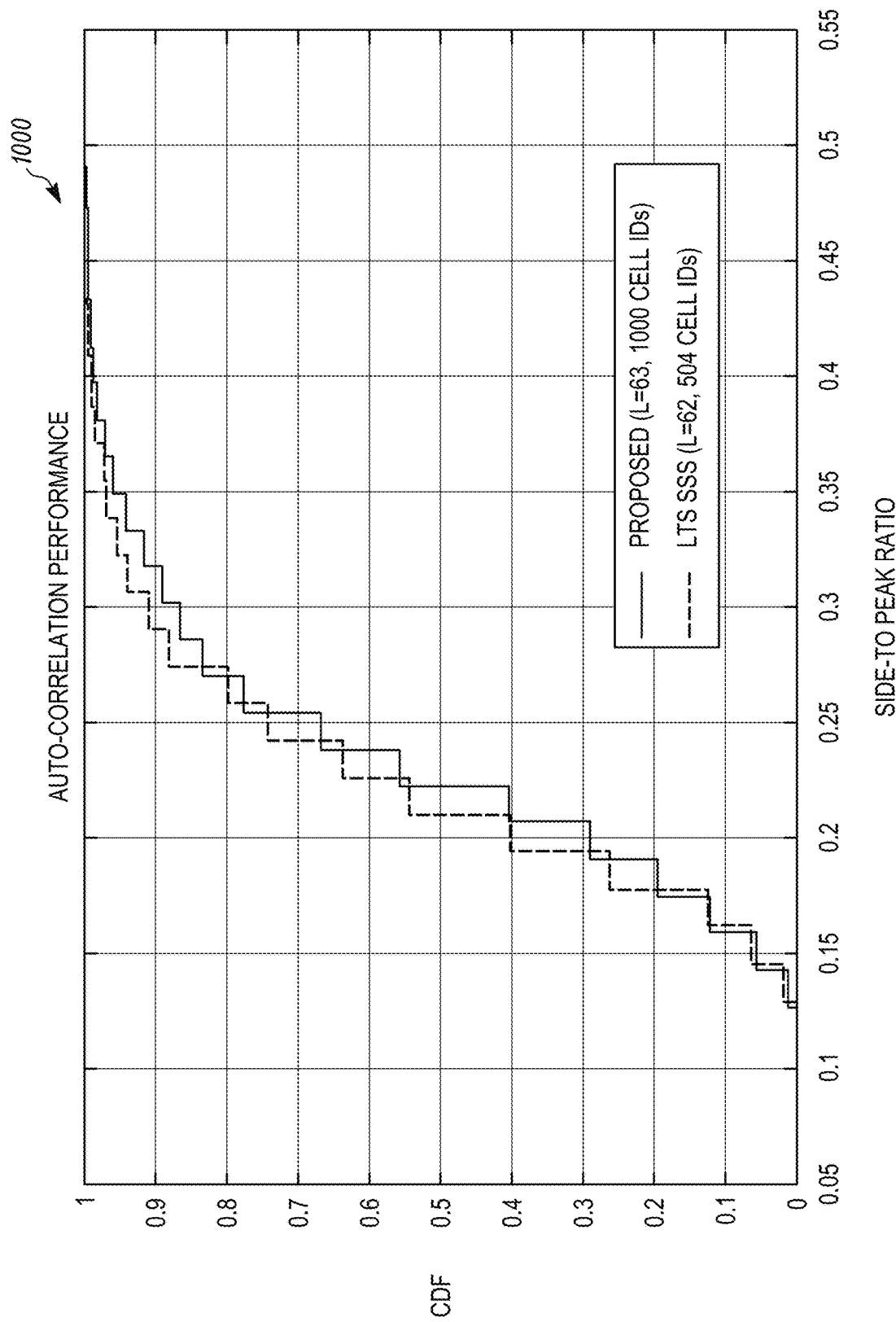
FIGS. 10 and 11 are example illustrations of auto-correlation and cross-correlation performance comparisons between proposed length-63 SSS sequences and LTE SSS sequences, respectively according to a possible embodiment.
Figure 11:
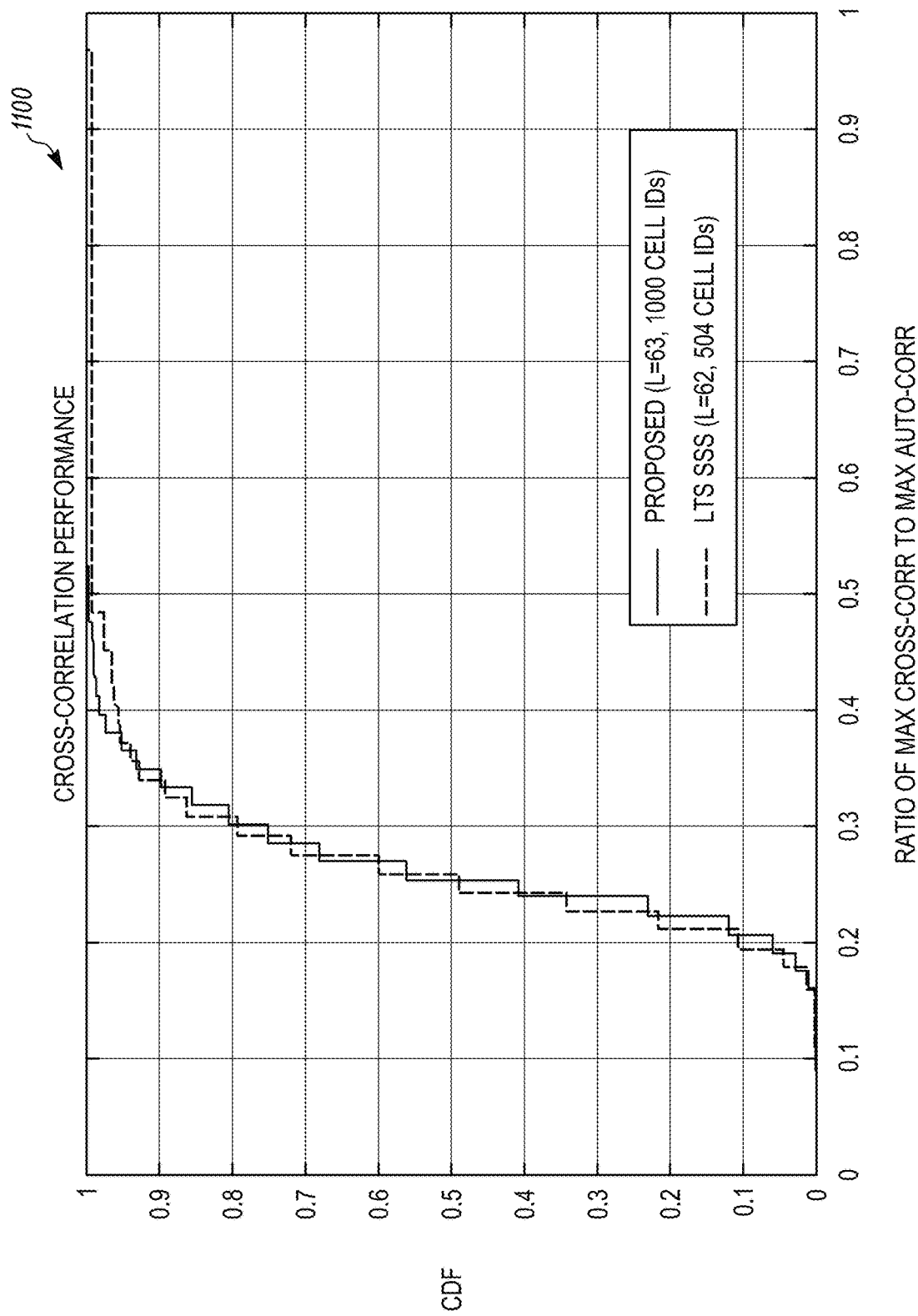

FIGS. 10 and 11 are example illustrations 1000 and 1100 of auto-correlation and cross-correlation performance comparisons between proposed length-63 SSS sequences and LTE SSS sequences, respectively, according to a possible embodiment. Since SSS can be detected in the frequency domain after timing and frequency acquisition from PSS, cross-correlation performance of SSS sequences can be a more important factor to impact on the overall cell detection performance. With similar sequence length, the proposed length-63 SSS sequences can show better cross-correlation performance, where normalized cross-correlation is upper-bounded by approximately 0.5.

Figure 12:
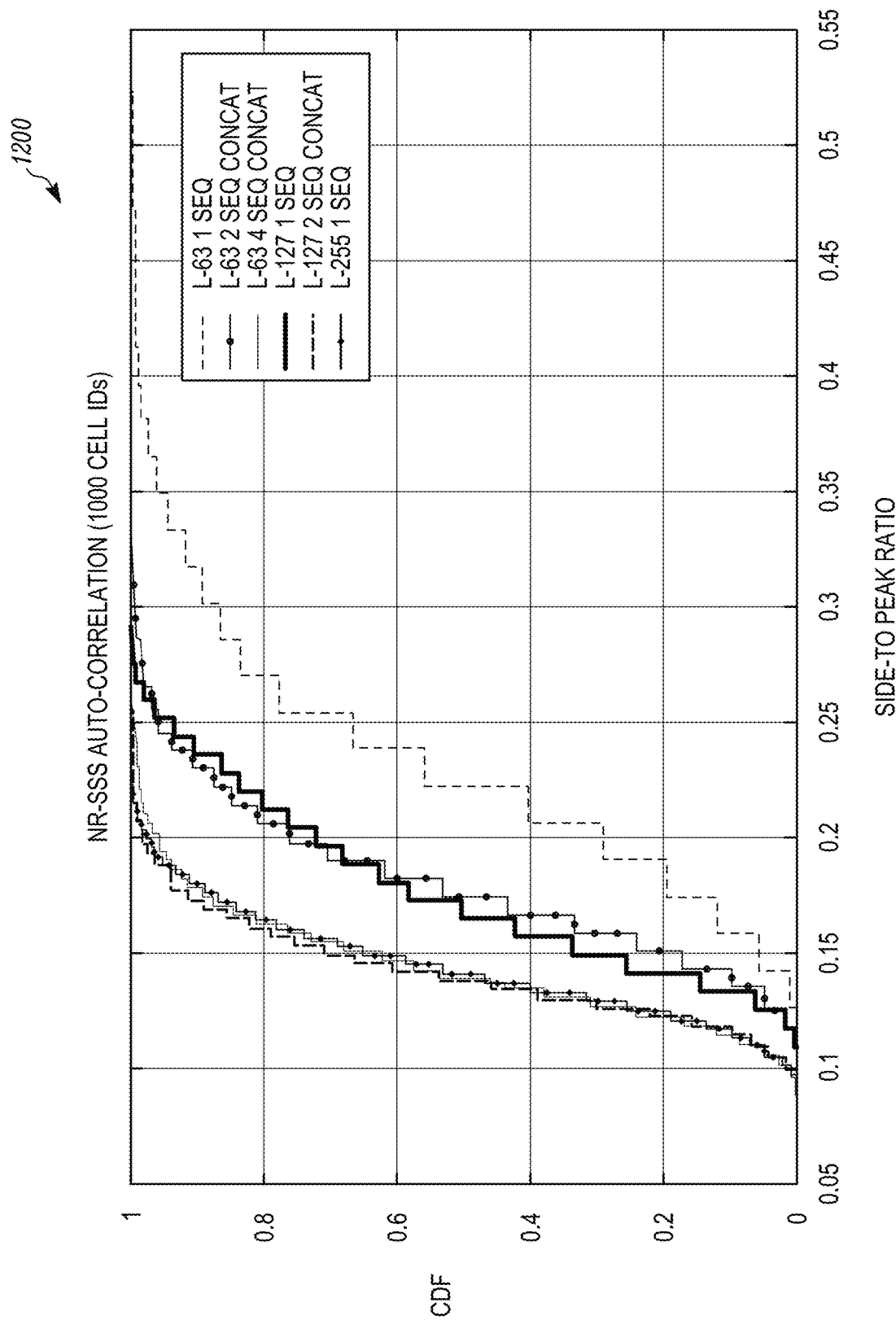
FIGS. 12 and 13 are example illustrations of auto-correlation and cross-correlation performances compared for various sequence lengths when proposed SSS sequence generation methods are employed according to a possible embodiment.
Figure 13:
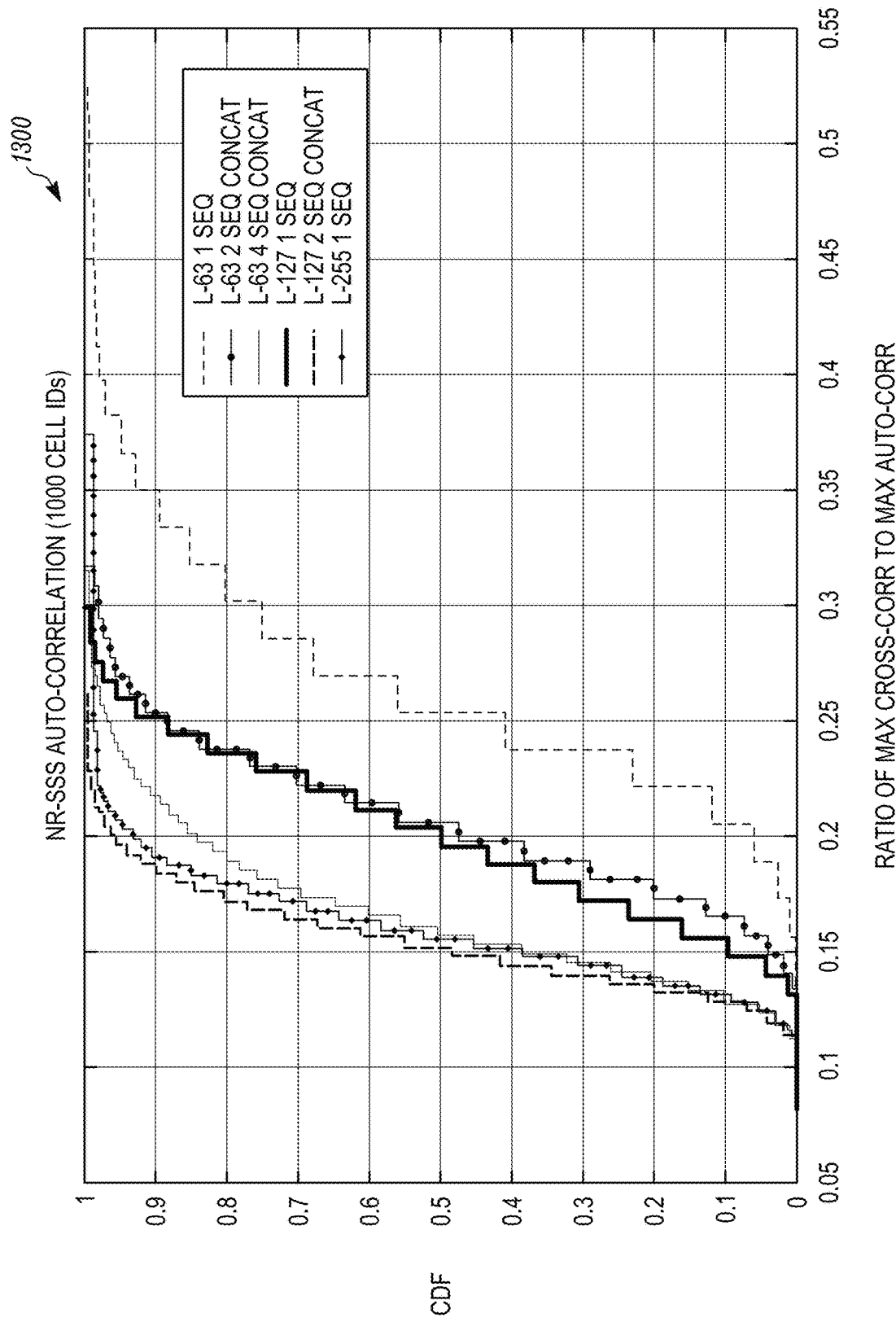

FIGS. 12 and 13 are example illustrations 1200 and 1300 of auto-correlation and cross-correlation performances compared for various sequence lengths, when proposed SSS sequence generation methods are employed according to a possible embodiment. In the illustration 1300 it is shown that concatenation of two length-127 sequences can yield the best cross-correlation performance among various sequence lengths and generation methods, where the normalized cross-correlation value can be upper-bounded by 0.26. With 15 kHz subcarrier spacing, SSS transmission bandwidth for two concatenated length-127 sequences can be roughly 4 MHz, which can be suitable for a carrier bandwidth of 5 MHz or wider.

Figure 14:
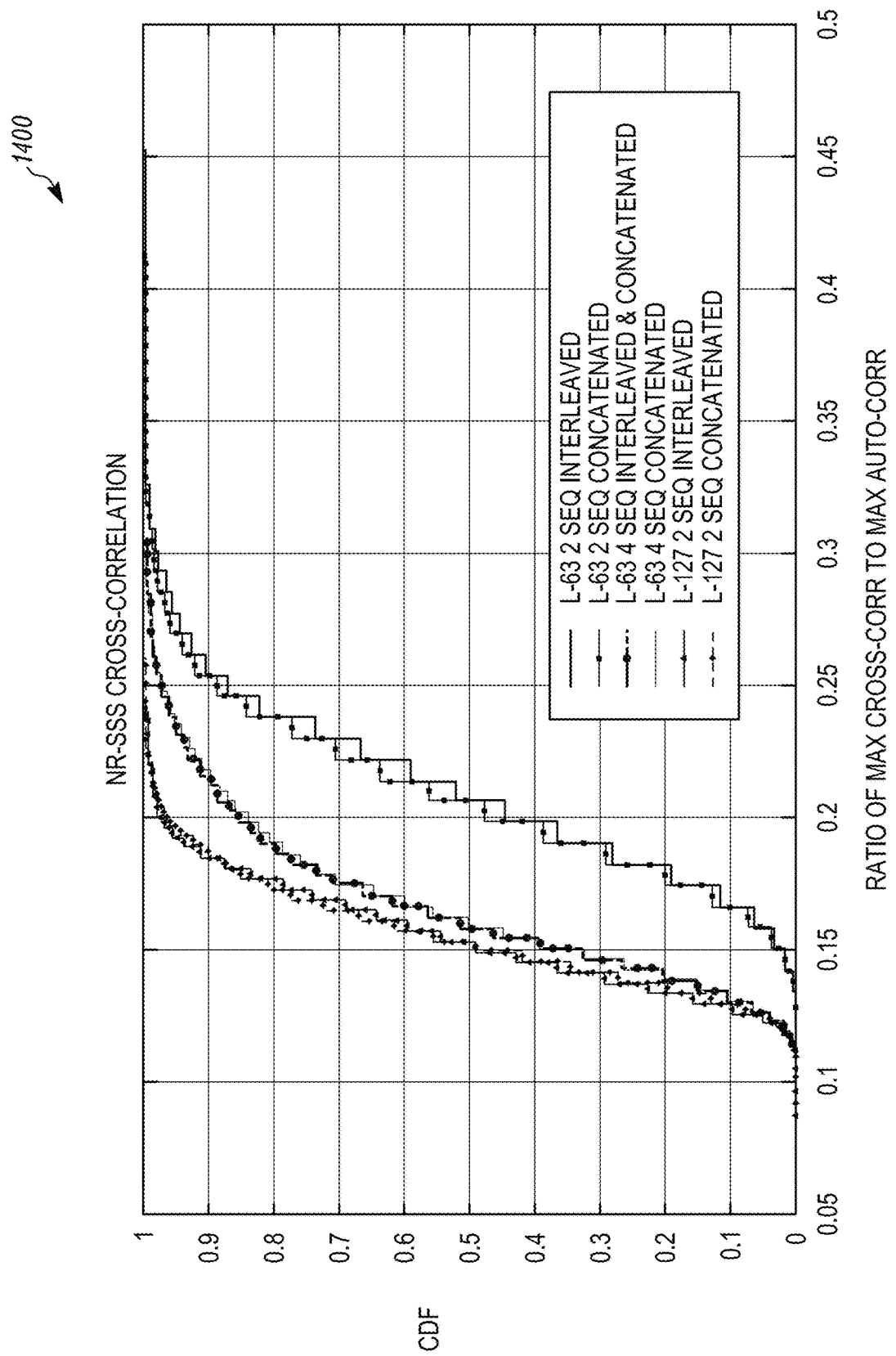
FIG. 14 is an example illustration of cross-correlation performances of concatenated sequences and interleaved sequences according to a possible embodiment.

FIG. 14 is an example illustration 1400 of cross-correlation performances of concatenated sequences and interleaved sequences according to a possible embodiment. With a given SSS sequence length, concatenated sequences can have slightly lower upper bounds, but in overall both schemes can perform very similarly. These results show that proposed sequence generation methods can be suitable for interleaving or concatenation, which can be used for multiple antenna port transmission or for support of UEs with various operating bandwidth.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all of, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   receiving a first synchronization signal associated with a first identity;
      wherein a first synchronization signal sequence for the first synchronization signal is defined by at least an element-wise multiplication of a first cyclically shifted sequence with a second cyclically shifted sequence,
         where the first cyclically shifted sequence is a first base sequence cyclically shifted with a first cyclic shift value, and
         where the second cyclically shifted sequence is a second base sequence cyclically shifted with a second cyclic shift value, and
   receiving a second synchronization signal associated with a second identity;
      wherein a second synchronization signal sequence for the second synchronization signal is defined by at least an element-wise multiplication of a third cyclically shifted sequence with a fourth cyclically shifted sequence,
         where the third cyclically shifted sequence is the first base sequence cyclically shifted with a third cyclic shift value, and
         where the fourth cyclically shifted sequence is the second base sequence cyclically shifted with a fourth cyclic shift value;
   determining that the first identity and the second identity are the same in response to
      the first cyclic shift value and the third cyclic shift value being same, and
      the second cyclic shift value and the fourth cyclic shift value being different.

2. The method according to claim 1,
   wherein the first synchronization signal sequence for the first synchronization signal is received in a first bandwidth,
   wherein the first synchronization signal sequence for the first synchronization signal and the second synchronization signal sequence for the second synchronization signal are received in a second bandwidth, and
   wherein the second bandwidth is larger than the first bandwidth.

3. The method according to claim 1,
wherein the first synchronization signal sequence for the first synchronization signal is mapped to a first set of subcarriers,
wherein the second synchronization signal sequence for the second synchronization signal is mapped to a second set of subcarriers, and
wherein the first and second set of subcarriers are interleaved.

4. The method according to claim 1,
wherein the first synchronization signal is received when operating with a first antenna port, and
wherein the second synchronization signal is received when operating with a second antenna port.

5. The method according to claim 1, wherein the first base sequence is a maximum-length shift-register sequence and the second base sequence is a maximum-length shift-register sequence.

6. The method according to claim 1, wherein the first synchronization signal sequence for the first synchronization signal and the second synchronization signal sequence for the second synchronization signal are received sequentially in the time domain.

7. The method according to claim 1, wherein the first synchronization signal sequence for the first synchronization signal and the second synchronization signal sequence for the second synchronization signal are received interleaved in the time domain.

8. The method according to claim 1,
wherein the first synchronization signal sequence for the first synchronization signal is mapped to a first set of subcarriers,
wherein the second synchronization signal sequence for the second synchronization signal is mapped to a second set of subcarriers,
wherein the first set of subcarriers are contiguous,
wherein the second set of subcarriers are contiguous, and
wherein the first set of subcarriers and the second set of subcarriers are non-overlapping.

9. The method according to claim 1, further comprising synchronizing with at least one base station using the first synchronization signal and the second synchronization signal.

10. The method according to claim 1, further comprising:
determining at least one physical cell identity based on the first synchronization signal and the second synchronization signal; and
communicating, using the at least one physical cell identity, with a wireless network.

11. An apparatus comprising:
a transceiver that
receives a first synchronization signal associated with a first identity,
wherein a first synchronization signal sequence for the first synchronization signal is defined by at least an element-wise multiplication of a first cyclically shifted sequence with a second cyclically shifted sequence,
where the first cyclically shifted sequence is a first base sequence cyclically shifted with a first cyclic shift value, and
where the second cyclically shifted sequence is a second base sequence cyclically shifted with a second cyclic shift value, and
receives a second synchronization signal associated with a second identity,
wherein a second synchronization signal sequence for the second synchronization signal is defined by at least an element-wise multiplication of a third cyclically shifted sequence with a fourth cyclically shifted sequence,
where the third cyclically shifted sequence is the first base sequence cyclically shifted with a third cyclic shift value, and
where the fourth cyclically shifted sequence is the second base sequence cyclically shifted with a fourth cyclic shift value; and
a controller coupled to the transceiver, where the controller determines that the first identity and the second identity are the same in response to
the first cyclic shift value and the third cyclic shift value being the same, and
the second cyclic shift value and fourth cyclic shift value being different.

12. The apparatus according to claim 11,
wherein the first synchronization signal sequence for the first synchronization signal is received in a first bandwidth,
wherein the first synchronization signal sequence for the first synchronization signal and the second synchronization signal sequence for the second synchronization signal are received in a second bandwidth, and
wherein the second bandwidth is larger than the first bandwidth.

13. The apparatus according to claim 11,
wherein the first synchronization signal sequence for the first synchronization signal is mapped to a first set of subcarriers,
wherein the second synchronization signal sequence for the second synchronization signal is mapped to a second set of subcarriers, and
wherein the first and second set of subcarriers are interleaved.

14. The apparatus according to claim 11, further comprising:
a first antenna port coupled to the controller, where first antenna port receives the first synchronization signal when operating with the first antenna port; and
a second antenna port coupled to the controller, where the second antenna port receives the second synchronization signal when operating with the second antenna port.

15. The apparatus according to claim 11, wherein the first and second base sequences are maximum-length shift-register sequences.

16. The apparatus according to claim 11, wherein the first synchronization signal sequence for the first synchronization signal and the second synchronization signal sequence for the second synchronization signal are received sequentially in the time domain.

17. The apparatus according to claim 11, wherein the first synchronization signal sequence for the first synchronization signal and the second synchronization signal sequence for the second synchronization signal are received interleaved in the time domain.

18. The apparatus according to claim 11,
wherein the first synchronization signal sequence for the first synchronization signal is mapped to a first set of subcarriers,
wherein the second synchronization signal sequence for the second synchronization signal is mapped to a second set of subcarriers,
wherein the first set of subcarriers are contiguous, wherein the second set of subcarriers are contiguous, and
wherein the first set of subcarriers and the second set of subcarriers are non-overlapping.

19. The apparatus according to claim 11, wherein the controller synchronizes with at least one base station using the first synchronization signal and the second synchronization signal.

20. The apparatus according to claim 11,
wherein the controller determines at least one physical cell identity based on the first synchronization signal and the second synchronization signal, and
wherein the transceiver communicates, using the at least one physical cell identity, with a wireless network.

21. The method according to claim 1, wherein a first set of base sequences used for the first synchronization signal sequence is the same as a second set of base sequences used for the second synchronization signal sequence.

22. The apparatus according to claim 11, wherein a first set of base sequences used for the first synchronization signal sequence is the same as a second set of base sequences used for the second synchronization signal sequence.

* * * * *